(12) United States Patent
Kassaei

(10) Patent No.: US 11,270,249 B1
(45) Date of Patent: Mar. 8, 2022

(54) SCHEDULING AND OPERATIONS OPTIMIZATION

(71) Applicant: eBay Inc., San Jose, CA (US)

(72) Inventor: Farhang R. Kassaei, Saratoga, CA (US)

(73) Assignee: eBay Inc., San Jose, CA (US)

( * ) Notice: Subject to any disclaimer, the term of this patent is extended or adjusted under 35 U.S.C. 154(b) by 678 days.

(21) Appl. No.: 14/588,171

(22) Filed: Dec. 31, 2014

Related U.S. Application Data

(60) Provisional application No. 61/944,486, filed on Feb. 25, 2014.

(51) Int. Cl.
*G06Q 10/08* (2012.01)

(52) U.S. Cl.
CPC .............................. *G06Q 10/0835* (2013.01)

(58) Field of Classification Search
CPC ........... G06Q 10/0835; G06Q 10/0836; G06Q 10/08; G06Q 10/0832; G06Q 10/08355; G06Q 10/083
See application file for complete search history.

(56) References Cited

U.S. PATENT DOCUMENTS

| | | | | |
|---|---|---|---|---|
| 8,341,035 | B2 * | 12/2012 | Mesaros | G06Q 10/06375 705/26.61 |
| 2001/0050615 | A1 * | 12/2001 | Kucharczyk | G07F 7/10 340/568.1 |
| 2004/0153370 | A1 * | 8/2004 | Yang | G06Q 10/08 705/26.1 |
| 2007/0227913 | A1 * | 10/2007 | Shoenfeld | G01K 1/022 206/1.5 |
| 2010/0318444 | A1 * | 12/2010 | Quadir | G06Q 30/06 705/27.1 |
| 2013/0261792 | A1 * | 10/2013 | Gupta | G06Q 10/08 700/232 |
| 2014/0278099 | A1 * | 9/2014 | Schenken | G06Q 10/02 701/533 |

(Continued)

OTHER PUBLICATIONS

Miller, C. C., & Clifford, S. (Oct. 22, 2013). In switch, walmart apes amazon; both retail giants' moves suggest stores and online are equally vital to them. International Herald Tribune Retrieved from https://dialog.proquest.com/professional/docview/1447464987?accountid=131444 (Year: 2013).*

*Primary Examiner* — Michael P Harrington
(74) *Attorney, Agent, or Firm* — Schwegman Lundberg & Woessner, P.A.

(57) ABSTRACT

A system and method optimize delivery of a good from a seller to a buyer through a drop-off location. The system illustratively includes at least one processor, configured to identify at least one attribute of the good from a plurality of such attributes; identify at least one attribute of the drop-off location from a plurality of such attributes; compile a match between the identified at least one attribute of the good and the identified at least one attribute of the drop-off location; identify at least one attribute of the seller from a plurality of such attributes; identify at least one attribute of the buyer from a plurality of such attributes; compile a match between the identified at least one attribute of the seller and the identified at least one attribute of the buyer; and select the drop-off location as a delivery destination of the good based on the two matches.

20 Claims, 8 Drawing Sheets

(56) References Cited

U.S. PATENT DOCUMENTS

2015/0112887 A1\* 4/2015 Camp ................ G06Q 10/0836
705/339
2015/0178677 A1\* 6/2015 Strand ................ G06Q 10/0836
705/28

\* cited by examiner

SCHEDULING AND OPERATIONS OPTIMIZATION

CROSS-REFERENCE TO RELATED APPLICATION

The present application claims the benefit of U.S. provisional application Ser. No. 61/944,486, filed Feb. 25, 2014, entitled "Scheduling and Operations Optimization," the disclosure of which is incorporated by reference herein in its entirety.

TECHNICAL FIELD

This application relates generally to the field of computer technology and, in a specific example embodiment, to a method and system for shipping an item.

BACKGROUND

Online marketplaces include many sellers listing items for sale. Buyers buy these items and sellers ship the items to the buyer upon receipt of payment. The shipping process typically includes the seller (or buyer) contracting with a delivery service to have the purchased goods shipped to the buyer. Other methods include the seller packing the item in a box, sealing it up, bringing it to the post office, filling out any necessary forms, weighing it to calculate the postage, paying for the postage, affixing the stamp on the box, and finally dropping the box in the parcel deposit area. Inefficient shipping processes can entail many steps and can become a deterrent for sellers to list, sell, and ship their items, and for buyers to purchase such items.

BRIEF DESCRIPTION OF THE DRAWINGS

The present disclosure is illustrated by way of example, and not by way of limitation, in the figures of the accompanying drawings in which.

DETAILED DESCRIPTION

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

Throughout the specification, claims, and drawings, the terms item and good are used interchangeably. The terms attribute and characteristic are also used interchangeably in the specification, claims, and drawings. The term value is used in different contexts in the specification. When referring to a value of a buyer or a seller, value is interchangeable with attribute or characteristic.

In one example, a system and method for dropping off an item at a locker are described. A locker is identified based on an identification of an item and a geographic location of a seller of the item listed in an online marketplace. A lock code and an unlock code for the locker are generated. The locker becomes locked in response to receiving the lock code at the locker and opens in response to receiving the unlock code at the locker. The lock code, the geographical location of the locker, and an identification of the locker are communicated to the seller of the item.

In another example, a system and method for scheduling and optimizing shipping operations is described.

System Architecture

Figure 1:
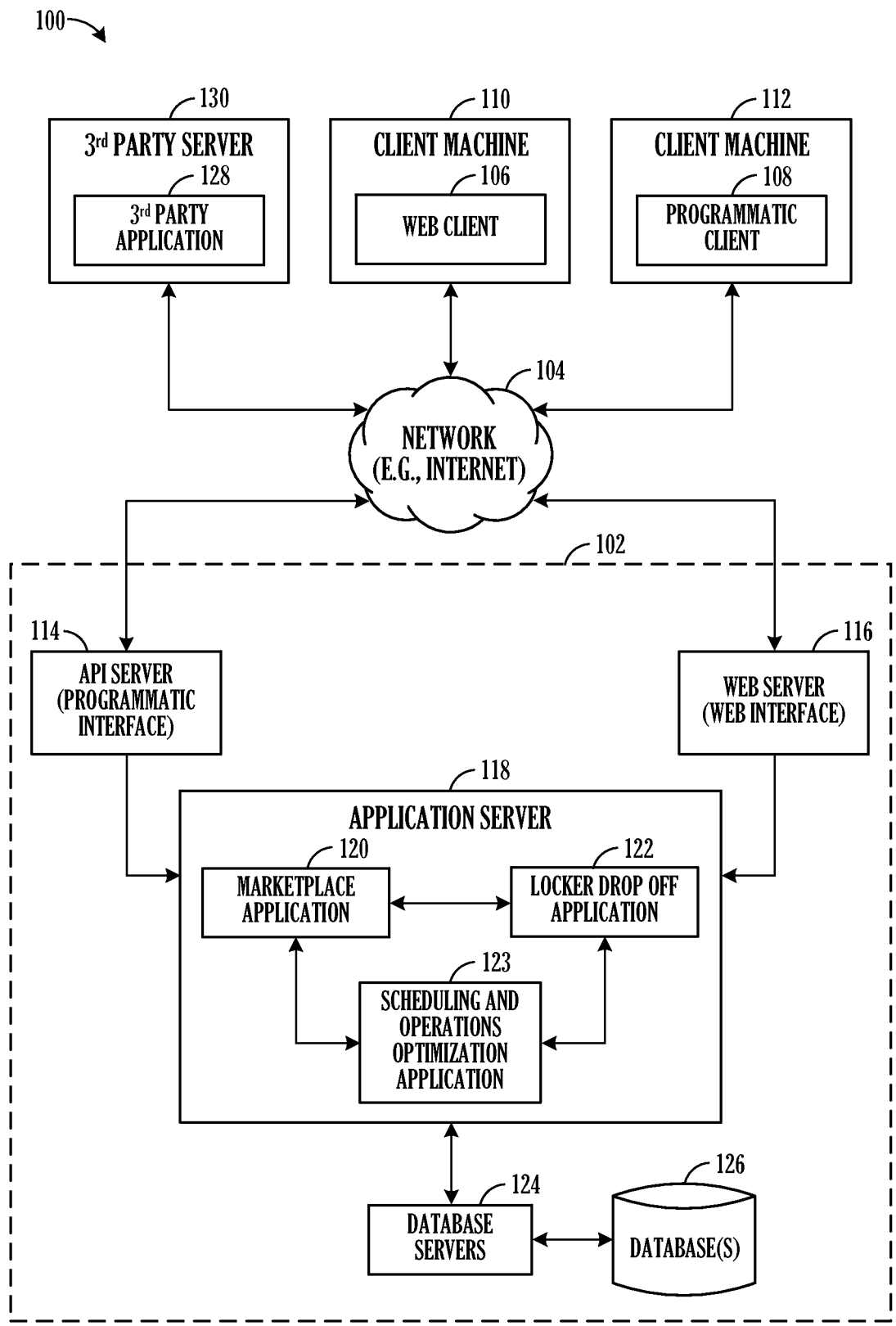
FIG. 1 is a network diagram depicting a network system having a client-server architecture configured for exchanging data over a network, according to one embodiment.

FIG. 1 is a network diagram depicting a network system 100 having a client-server architecture configured for exchanging data over a network, according to one embodiment. For example, the network system 100 may be a publication/publisher system where clients may communicate and exchange data within the network system 100. The data may pertain to various functions (e.g., online item purchases) and aspects (e.g., managing content and user reputation values) associated with the network system 100 and its users. Although illustrated herein as a client-server architecture, other embodiments may include other network architectures, such as peer-to-peer or distributed network environments.

A data exchange platform, in an example form of a marketplace application 120, a locker drop-off application 122, and a scheduling and operations optimization application 123 may provide server-side functionality via a network 104 (e.g., the Internet) to one or more clients. The one or more clients may include users that utilize the network system 100 and, more specifically, the marketplace application 120 and the locker drop-off application 122, to exchange data over the network 104.

These transactions may include transmitting, receiving (communicating), and processing data to, from, and regarding content and users of the network system 100. The data may include, but are not limited to, content and user data such as user profiles; user attributes; product and service reviews and information, such as pricing and descriptive information; product, service, manufacturer, and vendor recommendations and identifiers; product and service listings associated with buyers and sellers; auction bids; and transaction data, such as collection and payment, shipping transactions, shipping label purchases, and real time synchronization of financial journals, among others.

In various embodiments, the data exchanges within the network system 100 may be dependent upon user-selected functions available through one or more client or user interfaces (UIs). The UIs may be associated with a client machine, such as a client machine 110 using a web client 106. The web client 106 may be in communication with the marketplace application 120 via a web server 116. The UIs may also be associated with a client machine 112 using a programmatic client 108, such as a client application, or a third party server 130 with a third party application 128. It can be appreciated that in various embodiments, the client machines 110, 112, or third party server 130 may be associated with a buyer, a seller, a third party electronic commerce platform, a payment service provider, a shipping service provider, or a financial institution system, each in communication with the network-based content publisher 102 and optionally each other. The buyers and sellers may be any one of individuals, merchants, or service providers.

Turning specifically to the marketplace application 120, the locker drop-off application 122, and the scheduling and operations optimization application 123, an application program interface (API) server 114 and a web server 116 are coupled to, and provide programmatic and web interfaces respectively to, one or more application servers 118. The application server 118 hosts one or more marketplace applications 120, one or more locker drop-off applications 122, and one or more scheduling and operations optimization applications 123. The application server 118 is, in turn, shown to be coupled to one or more database servers 124 that facilitate access to one or more databases 126.

In one embodiment, the web server 116 and the API server 114 communicate and receive data pertaining to listings and transactions, among other things, via various user input tools. For example, the web server 116 may send and receive data to and from a toolbar or webpage on a browser application (e.g., web client 106) operating on a client machine (e.g., client machine 110). The API server 114 may send and receive data to and from an application (e.g., programmatic client 108 or third party application 128) running on another client machine (e.g., client machine 112 or 3$^{rd}$ party server 130).

In one embodiment, the marketplace application 120 provides listings and price-setting mechanisms whereby a user may be a seller or buyer who lists or buys goods and/or services (e.g., for sale) published on the marketplace application 120.

In one embodiment, the locker drop-off application 122 includes a system and a method for identifying a locker, and generating a code to lock and a code to unlock to a seller of the marketplace application 120. The location and size of the locker may be based on the size of the item sold from the seller and the geographic location of the seller. In one embodiment, the locker drop-off application 122 includes a system and a method for generating a shipping label for a shipping carrier, and for communicating the code to unlock to the shipping carrier corresponding to the shipping label. The shipping carrier accesses the item in the locker using the code to unlock and packages the item if the item is not disposed in a shipping package. The shipping label is then affixed to the shipping package. The shipping carrier ships the item to the buyer identified in the shipping label.

In another embodiment, the locker drop-off application 122 determines whether the geographical distance between the buyer and the seller is within a distance threshold. For example, if the locker drop-off application 122 determines that the buyer and seller of the item are within 10 miles of each other, the locker drop-off application 122 may identify a locker that is located half way between the seller and the buyer. In another embodiment, the locker drop-off application 122 may identify an available locker that is located closer to the seller or buyer based on a number of factors such as reputation or ranking of seller/buyer, date/time of sale, number of lockers available between the residence/business location of the seller/buyer, and dynamic GPS location of a mobile device of the seller/buyer. The locker drop-off application 122 is described in more detail below with reference to FIG. 3.

In one embodiment, the scheduling and operations optimization application 123 uses algorithms (or other methods) to prioritize and schedule the shipping of items having various, identifiable attributes from sellers to buyers. The shipping operations involve the use of drop-off locations (such as lockers), typically situated close to a buyer, or requested by a buyer (e.g. occupant of a unit in a large condominium who would prefer not to have shipped items left at the unit's front door for fear of theft). The drop-off locations can be a scarce resource. Using a conventional algorithm for their use, such as "first come, first served" (in the sense that a buyer first purchasing a good is automatically sent the purchased good first) can lead to logjams, delays, and other inefficiencies. The scheduling and optimization of the use of drop-off locations by shippers, buyers and sellers can be prioritized, in one example method, using characteristics or values attributed to, or identified in, the sellers, buyers and the shipped items. The scheduling and operations optimization application 123 is described in more detail below with reference to FIG. 6.

Figure 2:
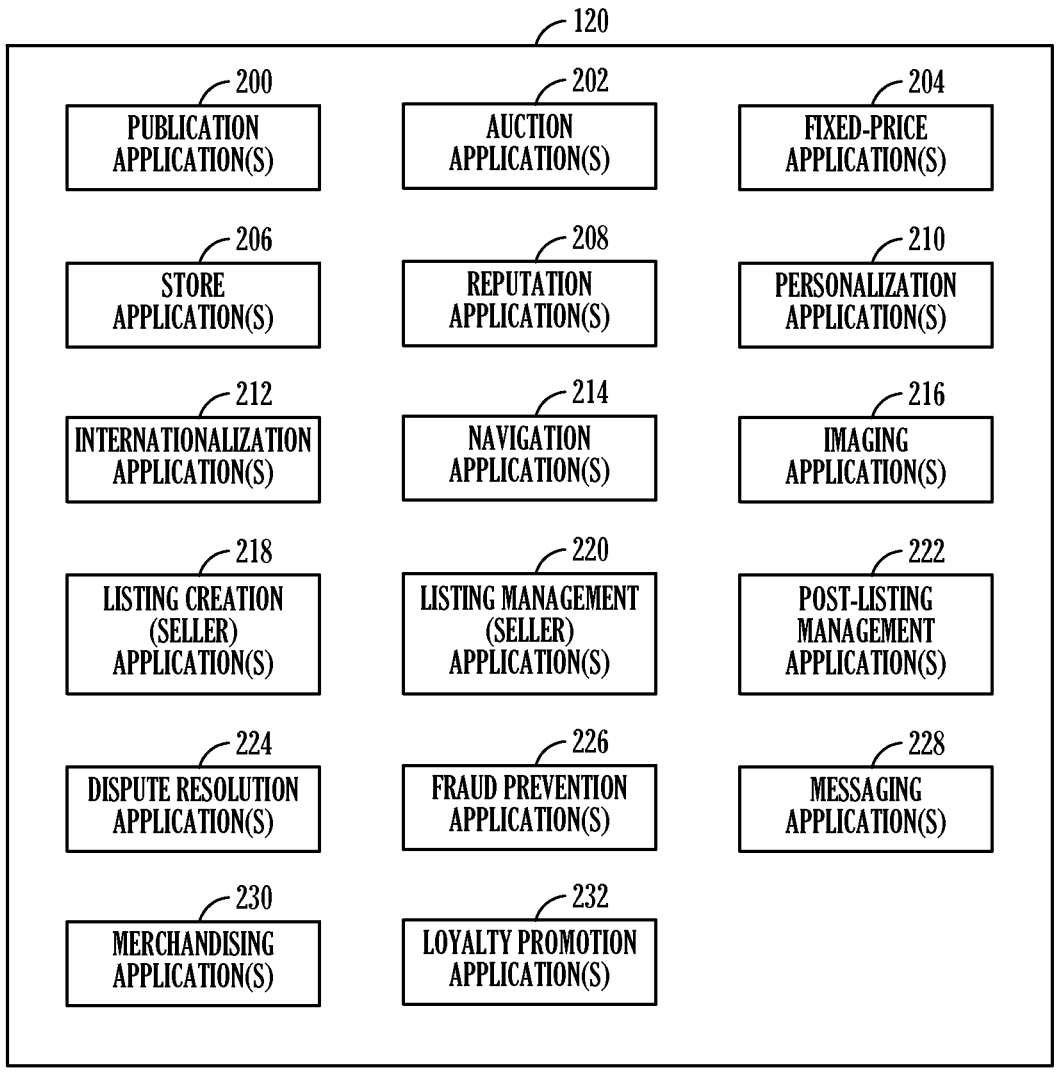
FIG. 2 shows a block diagram illustrating one example embodiment of a marketplace application.

FIG. 2 shows a block diagram illustrating one example embodiment of the marketplace application 120. The marketplace application 120 may be hosted on dedicated or shared server machines (not shown) that are communicatively coupled to enable communications between server machines. The marketplace application 120, the locker drop-off application 122, and the scheduling and optimization application 123 themselves are communicatively coupled (e.g., via appropriate interfaces) to each other and to various data sources, so as to allow information to be passed between the marketplace application 120, the locker drop-off application 122 and the scheduling and optimization application 123 so as to allow the marketplace application 120, the locker drop-off application 122 and the scheduling and optimization application 123 to share and access common data. The marketplace application 120, the locker drop-off application 122 and the scheduling and optimization application 123 may, furthermore, access one or more databases 126 via the database servers 124.

The network-based content publisher 102 may provide a number of publishing, listing, and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace application 120 is shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the network-based content publisher 102, to establish, build, and maintain reputations, which may be made available and published to potential trading partners. For example, consider that where the network-based content publisher 102 supports person-to-person trading, users may have no history or other reference information whereby the trustworthiness and credibility of potential trading partners may be assessed. The reputation applications 208 allow a user (for example, through feedback provided by other transaction partners) to establish a reputation within the network-based content publisher 102 over time. Other potential trading partners may then reference such a reputation for the purposes of assessing credibility and trustworthiness.

Personalization applications 210 allow users of the network-based content publisher 102 to personalize various aspects of their interactions with the network-based content publisher 102. For example a user may, utilizing an appropriate personalization application 210, create a personalized reference page in which information regarding transactions to which the user is (or has been) a party may be viewed. Further, a personalization application 210 may enable a user to personalize listings and other aspects of their interactions with the network-based content publisher 102 and other parties.

The network-based content publisher 102 may support a number of marketplaces that are customized, for example, for specific geographic regions. A version of the network-based content publisher 102 may be customized for the United Kingdom, whereas another version of the network-based content publisher 102 may be customized for the United States. Each of these versions may operate as an independent marketplace or may be customized (or internationalized) presentations of a common underlying marketplace. The network-based content publisher 102 may, accordingly, include a number of internationalization applications 212 that customize information (and/or the presentation of information) by the network-based content publisher 102 according to predetermined criteria (e.g., geographic, demographic or marketplace criteria). For example, the internationalization applications 212 may be used to support the customization of information for a number of regional websites that are operated by the network-based content publisher 102 and that are accessible via respective web servers 116.

Navigation of the network-based content publisher 102 may be facilitated by one or more navigation applications 214. For example, a search application (as an example of a navigation application 214) may enable key word searches of listings published via the network-based content publisher 102. A browse application may allow users to browse various category, catalogue, or inventory data structures according to which listings may be classified within the network-based content publisher 102. Various other navigation applications 214 may be provided to supplement the search and browsing applications.

In order to make listings available via network-based content publisher 102 as visually informing and attractive as possible, the marketplace application 120 and the locker drop-off application 122 may include one or more imaging applications 216, which users may utilize to upload images for inclusion within the listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the network-based content publisher 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the network-based content publisher 102.

Messaging applications 228 are responsible for the generation and delivery of messages to users of the network-based content publisher 102 (such as, for example, messages advising users regarding the status of listings at the network-based content publisher 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

Merchandising applications 230 support various merchandising functions that are made available to sellers to enable sellers to increase sales via the network-based content publisher 102. The merchandising applications 230 also operate the various merchandising features that may be invoked by sellers, and may monitor and track the success of merchandising strategies employed by sellers.

The network-based content publisher 102 itself, or one or more parties that transact via the network-based content publisher 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
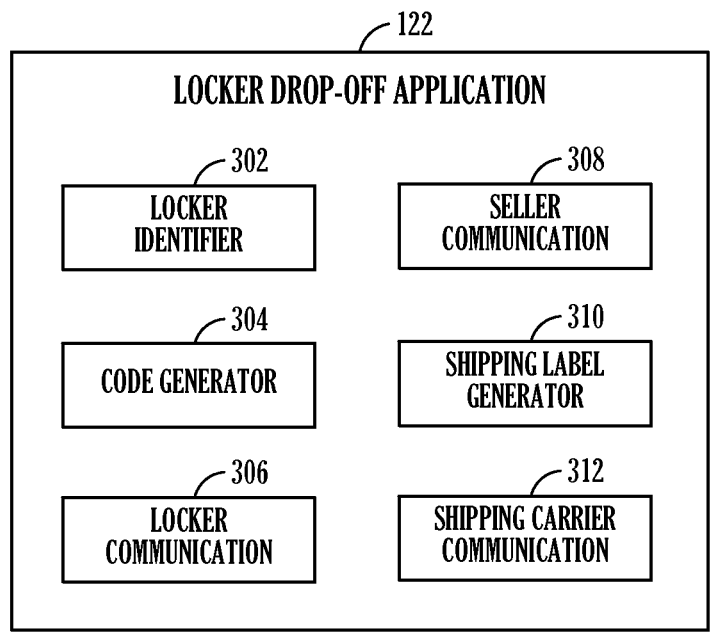
FIG. 3 shows a block diagram illustrating one example embodiment of a locker drop-off application.

FIG. 3 shows a block diagram illustrating one example embodiment of the locker drop-off application 122. The locker drop-off application 122 may include a locker identifier module 302, a code generator module 304, a locker communication module 306, a seller communication module 308, a shipping label generator module 310, and a shipping carrier communication module 312.

The locker identifier module 302 identifies a geographically static container, such as a physical locker based on an item (e.g., physical dimensions or size of the item, value of the item) and a geographic location of a seller of the item listed in the marketplace application 120. For example, the locker identifier module 302 may identify the address of a store or facility where the physical locker is located. Because the store or facility may include many physical lockers, the locker identifier module 302 may further identify the particular locker at the store using an identifier (e.g., locker 123 at 456 Main St.). It is noted that the locker identifier module 302 identifies lockers that are unlocked and available to receive the item at the time of request from the seller.

In another embodiment, the locker identifier module 302 identifies a locker based on other factors such as locker availability, the ranking or reputation of the seller in the marketplace application 120, the time of listing from the seller, and whether the seller has requested for a special sized locker. For example, the locker identifier module 302 may provide the seller with a list of facilities with available lockers within x miles of the home or work address of the seller. In response, the seller may select only particular facilities or store chains. For example, the locker identifier module 302 may identify available lockers only from store chain A located within x miles of the seller.

In another example, the locker identifier module 302 scans a database 126 of available lockers (e.g., unlocked) that are geographically located within a radius of x miles of the seller and that are in a facility or store that is open 24 hours a day.

In another example, the locker identifier module 302 identifies the physical dimensions of the item based on an identification of the item from the seller. The locker identifier module 302 then determines available lockers with sizes large enough to fit the item based on the physical dimensions of the item.

In another example, the locker identifier module 302 may request, from the seller, the physical dimensions of the item or the physical dimensions of a package used to ship the item. The locker identifier module 302 then determines available lockers with sizes large enough to fit the item based on the physical dimensions of the item or based on the physical dimensions of the package.

The code generator module 304 generates a lock code and an unlock code for the locker identified by the locker identifier module 302. The locker may close or become locked in response to receiving the lock code. The locker may open or become unlocked in response to receiving the unlock code.

In one embodiment, the locker receives the lock code and the unlock codes via a keypad located near the locker. The seller may input the lock code using the keypad located near the locker. In another embodiment, the locker may receive the lock code remotely from a mobile device of the seller. For example, the seller may activate the lock code on his mobile device when in proximity to the locker. The mobile device may communicate indirectly with the locker to activate the locking via a computer network 104 (e.g., Internet). For example, the mobile device of the seller may communicate the lock code (e.g., that is unique to every locker and valid for a one time usage) to a server in communication with the locker. After the server validates the lock code from the mobile device, the server instructs the locker to lock accordingly. In another embodiment, the mobile device of the seller may communicate directly with the locker via infrared, Wi-Fi, Bluetooth, NFC, or any other wireless means and send the lock code directly to the locker.

Similarly, a delivery person from a shipping carrier may manually enter the unlock code on the keypad of the locker to unlock the locker and access the item. The delivery person may, similarly, use a communication device to communicate the unlock code directly or indirectly to the locker to unlock the locker.

In one embodiment, the code generator module 304 generates lock codes and unlock codes that are unique and expire within a predefined amount of time from the time they are generated. For example, a lock code, if not used within a day, may become void and can no longer be used to lock a locker.

In another embodiment, the code generator module 304 may send a unique identifier to the seller. The unique identifier may be used to lock and unlock the locker. The unique identifier includes a random token generated by the code generator module 304 or may be based on biometric features of the seller, and unique information of the seller such as the seller's driver's license number or social security number.

The locker communication module 306 may communicate the unique identifier or unique information to the locker (corresponding to the locker identified by the locker identifier module 302) so that when the locker receives the unique identifier, the locker operates to be locked or unlocked accordingly (e.g., doors may open or close automatically, a lock on the corresponding locker door may be activated or deactivated). In one embodiment, the locker communication module 306 sends locking data (e.g., lock code, unlock code, seller information, shipping carrier information, among others). For example, the locker communication module 306 may send data from the driver's license of the seller or a credit card of the seller. The seller may only have to swipe his driver's license or credit card at a device connected to the locker to lock or unlock it without having to enter any code on any keypad of the locker.

The locker communication module 306 may receive status data regarding a status of the locker. For example, the status data may indicate whether the locker is opened or closed, whether a sensor inside the locker detects an item inside it, whether a lock of the locker is activated or deactivated, the time and date the locker was activated, the time and date the locker was locked or unlocked, the information received at the locker (e.g, code entered, magnetic bar code from an ID or a credit card). In one embodiment, the locker communication module 306 receives the lock or unlock code from the locker and determines the validity of the lock or unlock code. In another embodiment, the validation of the lock code or unlock code is performed at the locker instead of at the locker drop-off application 122. For example, the locker communication module 306 does not receive the lock or unlock code from the locker, but only receives an indication of whether the locker has been opened or closed.

The seller communication module 308 communicates the information of the locker to the seller in response to the seller requesting to dropoff an item for sale at a locker. For example, the information may include the geographic location of the locker (e.g., store ABC at 123 main st.), an identification of the locker (e.g., locker A2), and a lock code to lock the corresponding locker (or an unlock code to open the locker door).

In another embodiment, the seller communication module 308 receives information of the item from the seller. For example, the information may include an identification of the item (e.g., digital player brand x model y), the physical dimensions of the item (e.g., size of the actual item or package containing the item), value of the item (e.g., sell price), and so forth.

The shipping label generator module 310 may generate a shipping label for a shipping carrier based on the size and weight of the item, the address of the buyer, the type of shipping service selected by the seller (e.g., overnight, express, saver, ground), the value of the item, and whether the item is insured for shipping. The shipping label generator module 310 may communicate with a shipping carrier server (not shown) to generate the shipping label and a tracking number.

The shipping carrier communication module 312 communicates the information of the locker to the shipping carrier. For example, the information may include the geographic location of the locker (e.g., store ABC at 123 main st.), an identification of the locker (e.g., locker A2), and an unlock code to unlock the corresponding locker.

The shipping carrier communication module 312 may also receive information from the shipping label generator module 310 to generate the shipping label. The shipping carrier may then affix the shipping label to the item from the locker. In another embodiment, the shipping carrier communication module 312 may receive the shipping label from the shipping carrier communication module 312 and affix the label to the item from the locker.

In another embodiment, the shipping carrier communication module 312 may also receive information of the item. The shipping carrier may identify a box that is large enough to accommodate the item.

Figure 4:
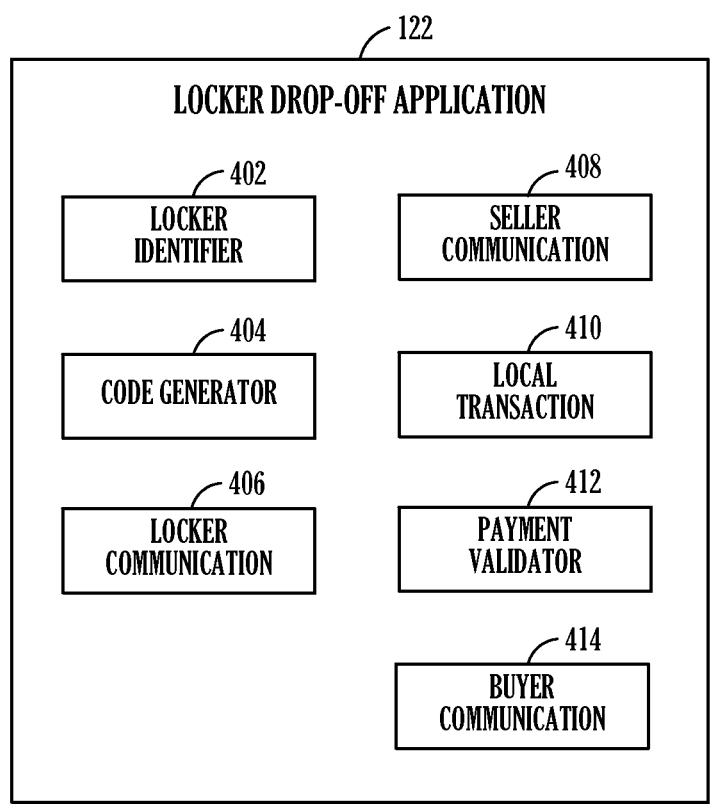
FIG. 4 shows a block diagram illustrating another example embodiment of a locker drop-off application.

FIG. 4 shows a block diagram illustrating another example embodiment of the locker drop-off application 122. The locker drop-off application 122 may include a locker identifier module 402, a code generator module 404, a locker communication module 406, a seller communication module 408, a local transaction module 410, a payment validator module 412, and a buyer communication module 414.

The local transaction module 410 identifies the address of the buyer and the seller and determines whether the distance between them is less than a distance threshold (e.g., 20 miles). If the local transaction module 410 determines that the seller is close enough to the buyer, the locker identifier module 402 may identify an available locker that is geographically located between the seller and the buyer. The distance between the available locker and the seller and the distance between the available locker and the buyer may be approximately the same. In another example, the locker may be located closer to the address of the seller if the seller is ranked relatively high in the online marketplace. In another example, the locker may be located closer to the address of the buyer if the buyer pays an additional fee or a convenience fee in the online marketplace. In another example, the locker may be located closer to the address of the buyer if the buyer's ranking is relatively high in the online marketplace.

The code generator module 404 may operate similarly to the code generator module 304 of FIG. 3. The locker communication module 406 may operate similarly to the locker communication module 306. The seller communication module 408 may operate similarly to seller communication module 308.

The payment validator module 412 may verify that the online marketplace has received and processed a payment from the buyer. Upon validation of the payment, the buyer communication module 414 sends information of the locker to the buyer. For example, the information may include the geographic location of the locker (e.g., store ABC at 123 main st.), an identification of the locker (e.g., locker A2), and an unlock code to unlock the corresponding locker.

Figure 5:
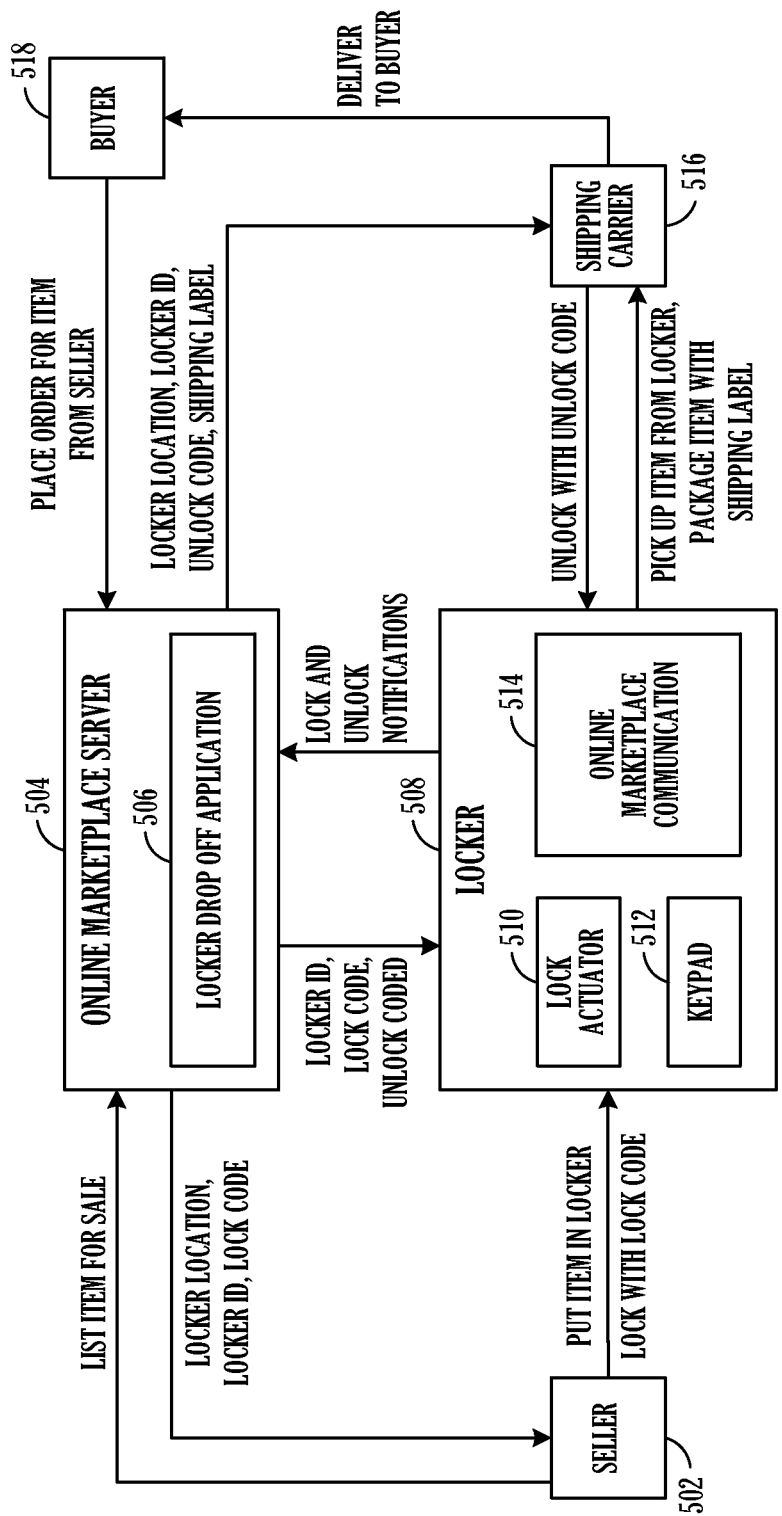
FIG. 5 shows a block diagram illustrating one example embodiment of an operation of a locker drop-off system to ship an item.

FIG. 5 shows a block diagram illustrating one example embodiment of an operation of a locker drop-off system to ship an item. A seller 502 may list an item for sale with the online marketplace server 504. The seller 502 may communicate information about the item (e.g., model, size, weight) to the online marketplace server 504. The online marketplace server 504 may receive an order for the item from a buyer 518.

The locker drop-off application 506 of the online marketplace server 504 receives the information from the seller 502 and identifies an available locker that is geographically located in proximity to an address of the seller 502 (e.g., home, work, or other). The locker drop-off application 506 identifies the item and determines a shipping carrier to process the shipping of the item. In one embodiment, the locker drop-off application 506 generates a locker identifier, a lock code, and an unlock code. The locker identifier may include a geographic location of the locker and an identification of the locker.

The locker drop-off application 506 communicates the locker identifier, the lock code, the unlock code to the locker 508. In one embodiment, the locker drop-off application 506 communicates a location of the locker 508, the locker identifier, and a lock code to the seller 502. The lock code allows the seller 502 to lock the item and the corresponding locker 508.

In one embodiment, the locker 508 includes a locker actuator 510, a keypad 512, and an online marketplace communication module 514. The seller 502 puts the item in the corresponding locker 508 and enters the lock code into the keypad 512 of the locker 508. In response to the lock code, the locker actuator 510 locks a door of the locker 508. The online marketplace communication module 514 may be configured to communicate with the locker drop-off application 506. For example, the online marketplace communication module 514 receives the lock code, the unlock code, and an identification of the locker 508. In one embodiment, the online marketplace communication module 514 notifies the locker drop-off application 506 of the status of the locker actuator 510. For example, the online marketplace communication module 514 may notify the locker drop-off application 506 of the time and date when the locker 508 has been locked and unlocked.

The locker drop-off application 506 also communicates the location of the locker 508, the locker identifier, the unlock code, and item information to the corresponding shipping carrier 516. A carrier from the shipping carrier 516 may retrieve the item from the locker 508 by entering the unlock code into the keypad 512 from the corresponding locker 508. In one embodiment, the shipping carrier 516 packages the item with a container having a size based on the item information.

In one embodiment, the locker drop-off application 506 also generates a shipping label for the shipping carrier 516. The shipping carrier 516 may affix the shipping label, received from the locker drop-off application 506, to the container.

The shipping carrier 516 may process and deliver the package or container to the buyer 518 according to the shipping service specified on the shipping label.

Figure 6:
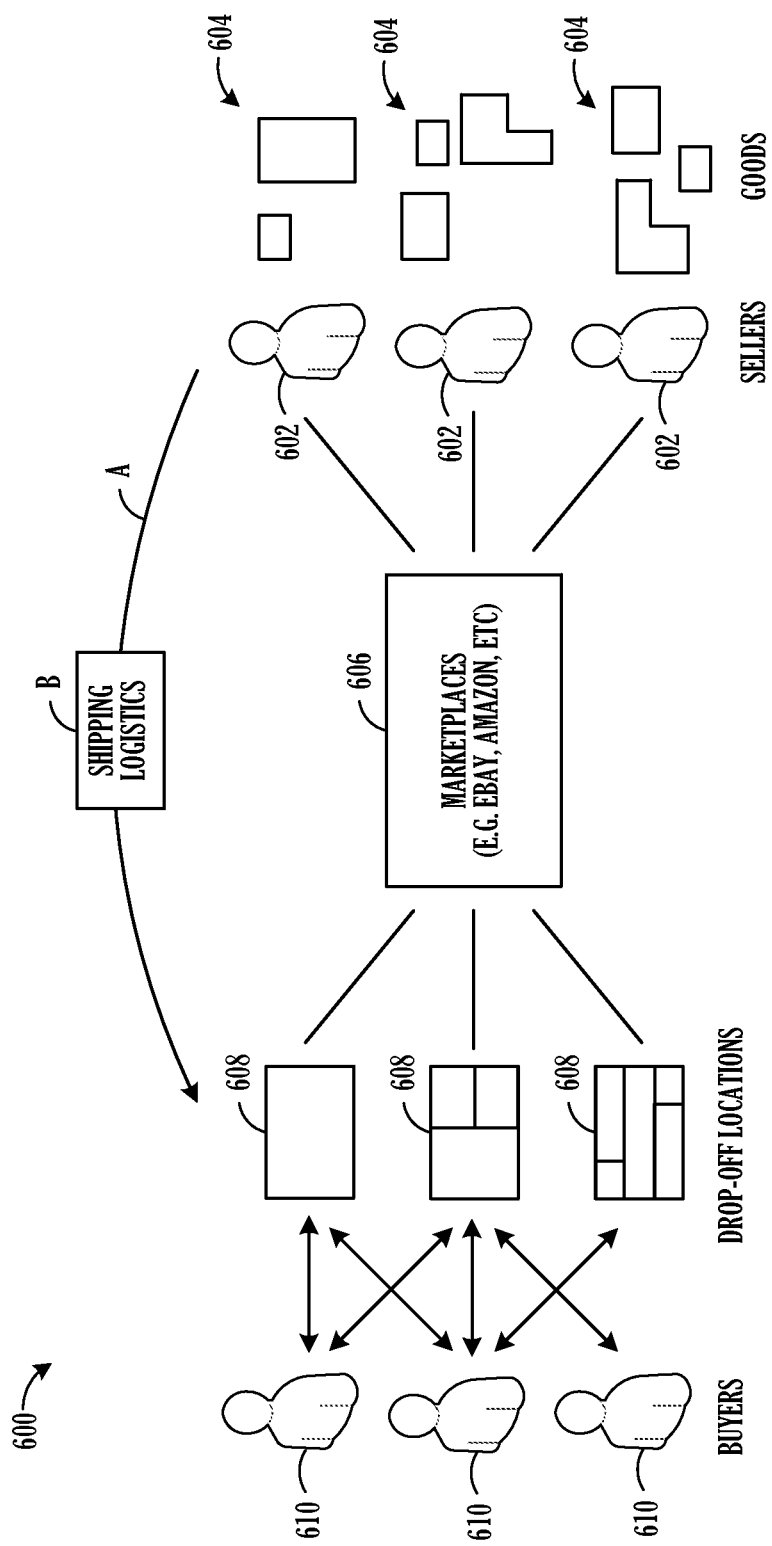
FIG. 6 shows a diagram illustrating aspects of scheduling and operations optimization, in accordance with example embodiments.

FIG. 6 shows an environment 600 in which scheduling and operations optimization methods may be employed in accordance with the present disclosure. The environment 600 includes sellers 602, goods 604 listed for sale by the sellers 602, and buyers 610. The goods 604 can be listed for sale in a marketplace 606 (online or retail). Goods 604 purchased by the buyers 610 in the marketplace 606 can be shipped to the buyers 610 using drop-off locations 608. The drop-off locations 608 are a scarce resource and may be owned by a marketplace host or participant, or a third party. In some examples, the drop-off locations 608 include lockers 708 described elsewhere in this specification and in some examples are located proximate one or more buyers 610, or within a defined geographic region of one or more buyers 610.

The goods 604 may have various attributes or characteristics that are identified in the present system and method. Some attributes and characteristics may be inherent, others may not be inherent. Attributes or characteristics of the goods 604 can include urgency of delivery, size, weight, price, flammability, frangibility, perishability, material content, and so forth. An attribute or characteristic of a good 604 that is germane to a potential logistical or shipping control issue is within the scope of the present disclosure. It will be appreciated that many attributes or characteristics are possible.

The drop-off locations 608 may have attributes or characteristics that do not readily permit storage of a good 604. For example, a drop-location may not be fire-proofed (to store a flammable good 604 for collection safely), or be highly secure (to store a valuable good 604 safely), or may not have cubicles sized to receive large furniture items, and so forth. There may be capacity constraints. Attributes or characteristics of the drop-off locations 608 can include geographical location, size, durability, security, availability, humidity, temperature, and so forth. It will be appreciated that the drop-off locations 608 are oftentimes scarce resources and that the properties (attributes and characteristics) of the drop-off locations 608 themselves may be scarce in the environment 600.

The drop-off locations 608 may be operated or owned by a marketplace participant (for example, a merchant), or a non-participating third party (for example, the USPS). Other owners or operating parties may include courier services (e.g. FEDEX™), a convenience store (e.g. a "711" store), a gas station, a condominium owner, a public facility, or the like. It will be appreciated that many types of owners or operators of drop-off locations 608 are possible. The attributes or characteristics of the goods 604 and drop-off locations 608 may be static or dynamic.

Optimization of the use and scheduling of such drop-off locations 608, particularly as scarce resources in an environment 600, is a goal of the present subject matter.

The sellers 602 and buyers 610 participating in the marketplace 606 may have defined attributes or characteristics, or "values", to another party in the marketplace 606, such as a merchant. Such "values" can include buyer or seller geographical locations, loyalty to a marketplace, reputation, and so forth. Other examples of "values" can include seller sales volume, sales values, trading volumes, loyalty points, target markets and so forth. Examples of "values" can also include buyer market segment, purchase volume, loyalty of the buyer to the seller, cost of the goods and price of the goods. Other values can include buyer or seller profit margins, pricing points, and delivery schedules. The values may be static or dynamic. Similarly, these values can be used singly or in combination as factors in the scheduling of goods 604 shipped to the drop-off locations 608. Certain deliveries to drop-off locations 608 may, for example, be prioritized (or not) based on the value of an identified buyer 610 or seller 602. In some examples, a loyal or high-volume seller 602 may request goods 604 to be shipped to a high-volume buyer 610 urgently, or within a certain time frame. If the shipping of goods 604 to the drop-off locations 608 is not optimized, there may not be a drop-off location 608 available to receive the urgent goods 604. Log jams and serious delays can result. A merchant operating a scheduling and operations optimization algorithm in accordance with the present disclosure can factor the attributes of goods 604, buyers 610 and sellers 602 into the algorithm to schedule the shipping of goods 604 to the various drop-off locations 608 in an efficient manner. Other attributes and characteristics for use in an algorithm may have nothing to do with a buyer 610, seller 602, or drop-off location 608, such as time of day, or season.

A traditional method of shipping purchased goods 604 to buyers 610 is shown by arrow A. In such a method, a third party postal or courier service B (such as UPS™, or FEDEX™, for example) receives or collects a good 604 sold by a seller 602 and delivers it to a buyer 610. The application of conventional first-come, first-served delivery rules can lead to inefficiencies. The present methods and systems seek to address these problems. These techniques allow great configurability and can be applied to environments which include many multiples of drop-off locations 608 and associated delivery service providers.

A decision flow for a merchant using the methods and systems of this disclosure might comprise the following decisions: do I give priority or offer this service to this buyer 610 or seller 602; if so, based on what value; what are the attributes or characteristics of the goods 604; what are the drop-off locations 608 within the applicable environment 600; what are the attributes or characteristics of the drop-off locations 608; which drop-off location 608 do I select for prioritized or scheduled delivery services to that drop-off location 608 for that buyer 610 or seller 602 based on a matching (absolute or relative) of the identified value, and an identified attribute or characteristic of the good 604 or drop-off location 608.

Figure 7:
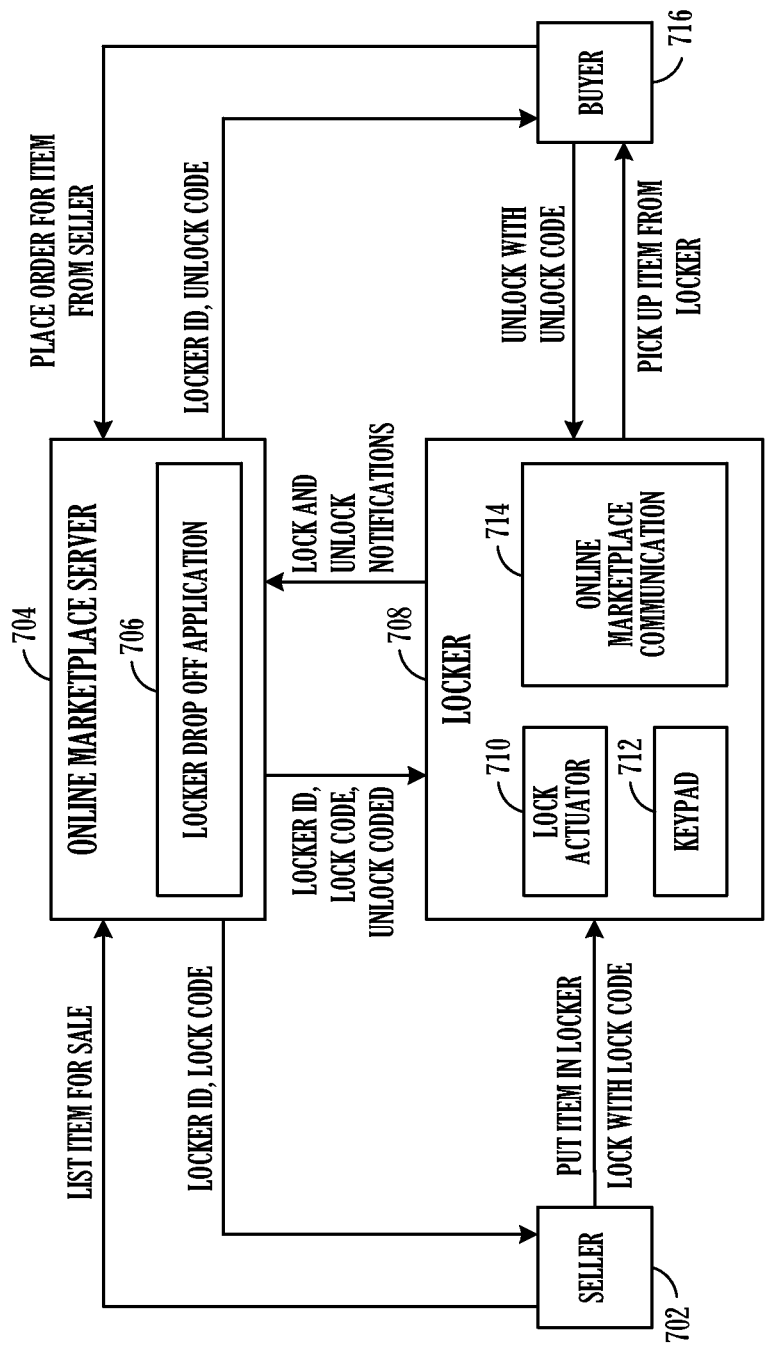
FIG. 7 shows a block diagram illustrating one example embodiment of an operation of a locker drop-off system to drop-off an item for a local buyer.

FIG. 7 shows a block diagram illustrating one example embodiment of an operation of a locker drop-off system to drop-off an item for a local buyer. A seller 702 may list an item for sale on the online marketplace server 704. The online marketplace server 704 also receives an order for the same item from a buyer 716.

The locker drop-off application 706 determines the distance between the seller 702 and the buyer 716. If the distance between the seller 702 and the buyer 716 is less than a threshold distance, the locker drop-off application 706 may determine that the transaction between the buyer 716 and the seller 702 is a local transaction. The locker drop-off application 706 identifies a locker 708 that is geographically in proximity to both the seller 702 and the buyer 716. For example, the locker 708 may be located at a same distance between the seller 702 and the buyer 716.

The locker 708 may include a locker actuator 710, a keypad 712, and an online marketplace communication module 714. The seller 702 receives information of the locker 708. The information may include a geographic location off the locker 708, a locker identifier, and a lock code. The seller 702 may put the item in the locker 708 without any packaging material and secure a door of the locker 708 using the lock code. The online marketplace communication module 714 may notify the locker drop-off application 706 of the status of the locker 708 (e.g., closed and locked, closed and unlocked, opened and unlocked, opened and locked).

The locker drop-off application 706 may communicate a location of the locker 708, the locker identifier, and the unlock code to the buyer 716. The buyer 716 may retrieve the item from the locker 708 using the unlock code provided by the locker drop-off application 706.

Figure 8:
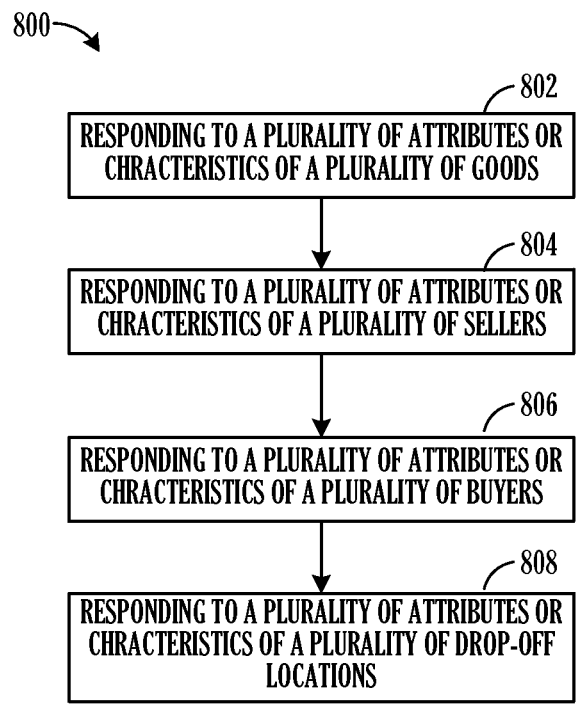
FIG. 8 shows a flow diagram illustrating one example embodiment of a method for scheduling and operations optimization.

FIG. 8 shows a flow diagram illustrating one example embodiment of a method 800 for scheduling and operations optimization, in accordance with the present subject matter. The method can be applied, in one example, to ship an item between a seller 602 and a buyer 610 through a drop-off location 608. The method 800 includes: at operation 802, responding to a plurality of attributes or characteristics of a plurality of goods; at operation 804, responding to a plurality of attributes or characteristics of a plurality of sellers; at operation 806, responding to a plurality of attributes or characteristics of a plurality of buyers; and at operation 808, responding to a plurality of attributes or characteristics of a plurality of drop-off locations; to enable a drop-off location selection that optimizes the delivery of the good from the seller to the buyer based on the plurality of attributes or characteristics of the goods, the sellers, the buyers, and the drop-off locations.

Further, method 800 does not require that operations 802, 804, 806 and 808 be performed sequentially or in any particular order.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 104.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware, may be a design choice. Below, are set out hardware (e.g., machine) and software architectures that may be deployed in various example embodiments.

Example Computer System

Figure 9:
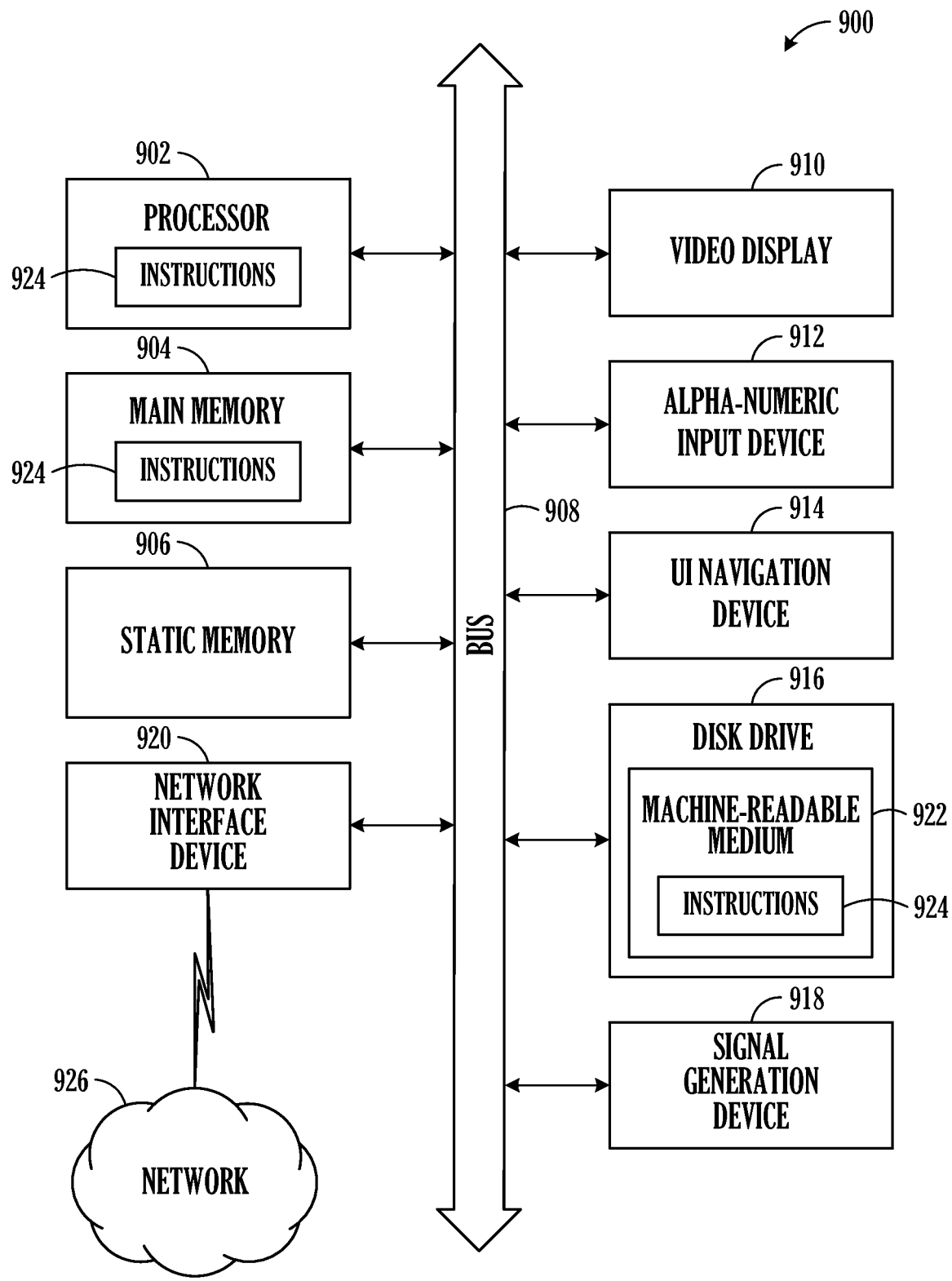
FIG. 9 shows a diagrammatic representation of a machine, in the example form of a computer system, within which a set of instructions may be executed to cause the machine to perform any one or more of the methodologies discussed herein.

FIG. 9 shows a diagrammatic representation of a machine in the example form of a computer system 900 within which a set of instructions 924 may be executed, causing the machine to perform any one or more of the methodologies discussed herein. In alternative embodiments, the machine operates as a standalone device or may be connected (e.g., networked) to other machines. In a networked deployment, the machine may operate in the capacity of a server or a client machine 130 or 112 in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 924 (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a central processing unit (CPU), a graphics processing unit (GPU, or both)), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a UI navigation device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 and data structures (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

The instructions 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding, or carrying a set of instructions 924 for execution by the machine and that cause the machine to perform any one or more of the methodologies of the present disclosure, or that is capable of storing, encoding or carrying data structures utilized by or associated with such a set of instructions 924. The term "machine-readable medium" shall, accordingly, be taken to include, but not be limited to, solid-state memories, optical media, and magnetic media.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A server for delivery of a good from a seller to a buyer through a drop-off location, the server comprising:
    at least one processor; and
    a storage device storing instructions that, when executed by the at least one processor, causes the at least one processor to perform operations comprising:

receiving, via a computer network, a listing for the good offered for sale by the seller and at least one attribute of the good from the seller;

receiving, via the computer network, an order for the good from the buyer;

receiving, via the computer network, sensor data associated with a locker at the drop-off location, the sensor data indicating an availability of the locker at the drop-off location;

identifying, by a locker identifier module, the at least one attribute of the good from a plurality of such attributes;

identifying, by the locker identifier module, at least one attribute of the drop-off location from a plurality of such attributes;

determining, by the locker identifier module, a match between the good and the drop-off location based on the identified at least one attribute of the good and the identified at least one attribute of the drop-off location;

identifying, by the locker identifier module, at least one attribute of the seller of the good from a plurality of such attributes;

identifying, by the locker identifier module, at least one attribute of the buyer of the good from a plurality of such attributes;

selecting, by the locker identifier module, the drop-off location as a delivery destination for the seller to deposit the good and for the buyer to retrieve the good in response to the order for the good from the buyer and in response to a selection by the seller of the drop-off location from a list of available drop-off locations, the list determined based on the match between the good and the drop-off location, the identified at least one attribute of the seller, the identified at least one attribute of the buyer, and the availability of the locker at the drop-off location;

generating, by a code generator module, a lock code for use by the seller to secure the good in a locker and an unlock code different from the lock code, the unlock code for use in retrieving the good by the buyer from the locker based on at least selecting the drop-off location;

transmitting, by a communication module via the computer network, to a mobile device of the buyer of the good, the drop-off location and the lock code to a mobile device associated with the seller of the good;

transmitting, by the communication module via the computer network, the unlock code to the locker;

receiving via the mobile device associated with the seller, the lock code from the mobile device associated with the seller;

validating the lock code;

locking the locker based on validating the lock code such that the good is secured at the drop-off location by the seller; and responsive to the good being secured by the seller at the drop-off location, transmitting, by the communication module via the computer network, the drop-off location and the unlock code to the mobile device of the buyer of the good.

2. The server of claim 1, wherein the at least one attribute of the good is selected from the group consisting of: size of the good; weight of the good; urgency of the delivery of the good; price of the good; flammability of the good; frangibility of the good; perishability of the good; and material content of the good.

3. The server of claim 1, wherein the at least one attribute of the seller is selected from the group consisting of: target market of the seller; loyalty of the seller to a marketplace; reputation of the seller; sales volume of the seller; profit margin of the seller; price point of the seller for the good; delivery schedule of the buyer; and sales value of the seller.

4. The server of claim 1, wherein the at least one attribute of the buyer is selected from the group consisting of: purchase volume of the buyer; market segment of the buyer; loyalty of the buyer to a marketplace; loyalty of the buyer to the seller; price point of the buyer for the good; delivery schedule of the buyer; and reputation of the buyer.

5. The server claim 1, wherein the at least one attribute of the drop-off location is selected from the group consisting of: size of the drop-off location; capacity of the drop-off location; durability of the drop-off location; extent to which the drop-off location is fire-proof, security of the drop-off location; availability of the drop-off location; a humidity of the drop-off location; and temperature of the drop-off location.

6. The server of claim 1, wherein the processor is further configured to generate a label with information about the good for delivery of the good from the seller to the buyer through the drop-off location.

7. The server of claim 6, wherein the information about the good is selected from the group consisting of: size of the good; weight of the good; geographic location of the buyer; geographic location of the seller; geographic location of the drop-off location; type of shipping service for the good; price of the good; and insurance for the good.

8. A method of delivery of a good from a seller to a buyer through a drop-off location, the method comprising:

using at least one processor of a server to perform operations comprising:
receiving, via a computer network, a listing for the good offered for sale by the seller and at least one attribute of the good from the seller;

receiving, via the computer network, an order for the good from the buyer;

receiving, via the computer network, sensor data associated with a locker at the drop-off location, the sensor data indicating an availability of the locker at the drop-off location;

using a locker identifier module implemented by a hardware processor of the server to perform operations comprising:

identifying the at least one attribute of the good from a plurality of such attributes;

identifying at least one attribute of the drop-off location from a plurality of such attributes;

determining a match between the good and the drop-off location based on the identified at least one attribute of the good and the identified at least one attribute of the drop-off location;

identifying at least one attribute of the seller of the good from a plurality of such attributes;

identifying at least one attribute of the buyer of the good from a plurality of such attributes;

selecting the drop-off location as a delivery destination for the seller to deposit the good and for the buyer to retrieve the good in response to the order for the good from the buyer and in response to a selection by the seller of the drop-off location from a list of available drop-off locations, the list determined based on the match between the good and the drop-off location, the identified at least one attribute of the seller, the identified at least one attribute of the buyer, and the availability of the locker at the drop-off location;

using a code generator module implemented by a hardware processor of the server to generate a lock code for use by the seller to secure the good in a locker and an unlock code different from the lock code, the unlock code for use in retrieving the good by the buyer from the locker based on at least selecting the drop-off location;

using a communication module implemented by a hardware processor of the server to transmit, via the computer network, to a mobile device of the buyer of the good, the drop-off location and the lock code to a mobile device associated with the seller of the good;

transmitting, by the communication module via the computer network, the unlock code to the locker;

receiving via the mobile device associated with the seller, the lock code from the mobile device associated with the seller;

validating the lock code at the server;

locking, by the server, the locker based on validating the lock code such that the good is secured at the drop-off location by the seller; and responsive to the good being secured by the seller at the drop-off location, transmitting, by the communication module via the computer network the drop-off location and the unlock code to the mobile device of the buyer of the good.

9. The method of claim 8, wherein the at least one attribute of the good is selected from the group consisting of:
size of the good;
weight of the good;
urgency of the delivery of the good;
price of the good;
flammability of the good;
frangibility of the good;
perishability of the good; and
material content of the good.

10. The method of claim 8, wherein the at least one attribute of the seller is selected from the group consisting of:
target market of the seller;
loyalty of the seller to a marketplace;
reputation of the seller;
sales volume of the seller;
profit margin of the seller;
price point of the seller for the good;
delivery schedule of the buyer; and
sales value of the seller.

11. The method of claim 8, wherein the at least one attribute of the buyer is selected from the group consisting of:
purchase volume of the buyer;
market segment of the buyer;
loyalty of the buyer to a marketplace;
loyalty of the buyer to the seller;
price point of the buyer for the good;
delivery schedule of the buyer; and
reputation of the buyer.

12. The method of claim 8, wherein the at least one attribute of the drop-off location is selected from the group consisting of:
size of the drop-off location;
capacity of the drop-off location;
durability of the drop-off location;
extent to which the drop-off location is fire-proof;
security of the drop-off location;
availability of the drop-off location;
humidity of the drop-off location; and
temperature of the drop-off location.

13. The method of claim 8, further comprising generating a label with information about the good for delivery of the good from the seller to the buyer through the drop-off location.

14. The method of claim 13, wherein the information about the good is selected from the group consisting of:
size of the good;
weight of the good;
geographic location of the buyer;
geographic location of the seller;
geographic location of the drop-off location;
type of shipping service for the good;
price of the good; and
insurance for the good.

15. A server comprising:
at least one processor; and
a storage device storing instructions that, when executed by the at least one processor, causes the at least one processor to perform operations comprising:
receiving via a computer network a listing for a good offered for sale by a seller and at least one attribute of the good from the seller;
receiving via the computer network an order for the good from a buyer;
receiving, via the computer network, sensor data associated with a locker at a drop-off location, the sensor data indicating an availability of the locker at the drop-off location;
identifying the at least one attribute of the good from a plurality of such attributes;
identifying, by a locker identifier module, at least one attribute of a drop-off location from a plurality of such attributes;
determining, by the locker identifier module, a match between the good and the drop-off location based on the identified at least one attribute of the good and the identified at least one attribute of the drop-off location;
identifying, by the locker identifier module, at least one attribute of the seller of the good from a plurality of such attributes;
identifying, by the locker identifier module, at least one attribute of the buyer of the good from a plurality of such attributes;
selecting, by the locker identifier module, the drop-off location as a delivery destination for the seller to deposit the good and for the buyer to retrieve the good in response to the order for the good from the buyer and in response to a selection by the seller of the drop-off location from a list of available drop-off locations, the list determined based on the match between the good and the drop-off location, the identified at least one attribute of the seller, the identified at least one attribute of the buyer, and the availability of the locker at the drop-off location;
generating, by a code generator module, a lock code for use by the seller to secure the good in a locker and an unlock code different from the lock code, the unlock code for use in retrieving the good by the buyer from the locker based on at least selecting the drop-off location; and
transmitting, by a communication module via the computer network to a mobile device of the buyer of the good, the drop-off location and the lock code to a mobile device associated with the seller of the good;

transmitting, by the communication module via the computer network, the unlock code to the locker;
receiving via the mobile device associated with the seller, the lock code from the mobile device associated with the seller;
validating the lock code;
locking the locker based on validating the lock code such that the good is secured at the drop-off location by the seller; and
responsive to the good being secured by the seller at the drop-off location, transmitting, by the communication module via the computer network the drop-off location and the unlock code to the mobile device of the buyer of the good.

16. The server of claim 15, wherein the at least one attribute of the good is selected from the group consisting of:
size of the good;
weight of the good;
urgency of the delivery of the good;
price of the good;
flammability of the good;
frangibility of the good;
perishability of the good; and
material content of the good.

17. The server of claim 15, wherein the at least one attribute of the seller is selected from the group consisting of:
target market of the seller;
loyalty of the seller to a marketplace;
reputation of the seller;
sales volume of the seller;
profit margin of the seller;
price point of the seller for the good;
delivery schedule of the buyer; and
sales value of the seller.

18. The server of claim 15, wherein the at least one attribute of the buyer is selected from the group consisting of:
purchase volume of the buyer;
market segment of the buyer;
loyalty of the buyer to a marketplace;
loyalty of the buyer to the seller;
price point of the buyer for the good;
delivery schedule of the buyer; and
reputation of the buyer.

19. The server of claim 15, wherein the at least one attribute of the drop-off location is selected from the group consisting of:
size of the drop-off location;
capacity of the drop-off location;
durability of the drop-off location;
extent to which the drop-off location is fire-proof;
security of the drop-off location;
availability of the drop-off location;
humidity of the drop-off location; and
temperature of the drop-off location.

20. The server of claim 15, wherein the operations further comprise generating a label with information about the good for delivery of the good from the seller to the buyer through the drop-off location.

* * * * *